US010694215B2

(12) United States Patent
Wenger et al.

(10) Patent No.: US 10,694,215 B2
(45) Date of Patent: *Jun. 23, 2020

(54) SEGMENT TYPES IN VIDEO CODING

(71) Applicant: TENCENT AMERICA LLC, Palo Alto, CA (US)

(72) Inventors: Stephan Wenger, Hillsborough, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/454,545

(22) Filed: Jun. 27, 2019

(65) Prior Publication Data
US 2020/0077119 A1 Mar. 5, 2020

Related U.S. Application Data

(63) Continuation of application No. 16/202,949, filed on Nov. 28, 2018, now Pat. No. 10,375,416.

(60) Provisional application No. 62/727,381, filed on Sep. 5, 2018.

(51) Int. Cl.
*H04N 19/31* (2014.01)
*H04N 19/70* (2014.01)
*H04N 19/11* (2014.01)
*H04N 19/159* (2014.01)
*H04N 19/174* (2014.01)
*H04N 19/44* (2014.01)

(52) U.S. Cl.
CPC ............ *H04N 19/70* (2014.11); *H04N 19/11* (2014.11); *H04N 19/159* (2014.11); *H04N 19/174* (2014.11); *H04N 19/44* (2014.11)

(58) Field of Classification Search
CPC ...... H04N 19/70; H04N 19/11; H04N 19/159; H04N 19/174; H04N 19/44
USPC ...................................................... 375/240.02
See application file for complete search history.

(56) References Cited

U.S. PATENT DOCUMENTS

2015/0312580 A1 10/2015 Hannuksela

FOREIGN PATENT DOCUMENTS

| WO | 2014/107565 A1 | 7/2014 |
| WO | 2015/006703 A2 | 1/2015 |

OTHER PUBLICATIONS

International Search Report dated Nov. 15, 2019 issued in International Application No. PCT/US19/46793.
(Continued)

*Primary Examiner* — Nguyen T Truong
(74) *Attorney, Agent, or Firm* — Sughrue Mion, PLLC

(57) ABSTRACT

A method of and an apparatus for decoding a coded picture of a coded video sequence including a first segment and a second segment, are provided. The method includes determining a first decoding process for decoding the first segment, in which a first prediction is disallowed, based on at least a first syntax element of a high level syntax structure applicable to the first segment and the second segment, the first syntax element indicating that the first prediction is disallowed, and determining a second decoding process for decoding the second segment, in which a second prediction different than the first prediction is disallowed, based on at least a second syntax element of the high level syntax structure, the second syntax element indicating that the second prediction is disallowed.

20 Claims, 13 Drawing Sheets

(56) References Cited

OTHER PUBLICATIONS

Written Opinion dated Nov. 15, 2019 issued in International Application No. PCT/US19/46793.

FIG. 2  Streaming System 200

FIG. 4   Encoder 203

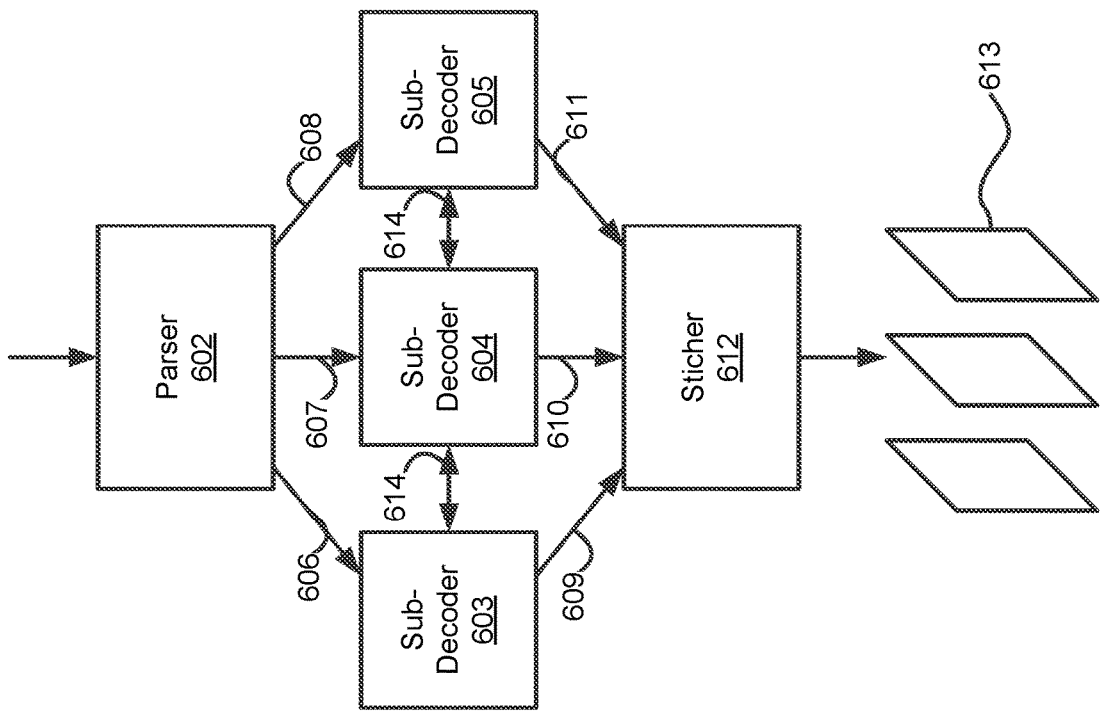
Fig. 6b  System 600b
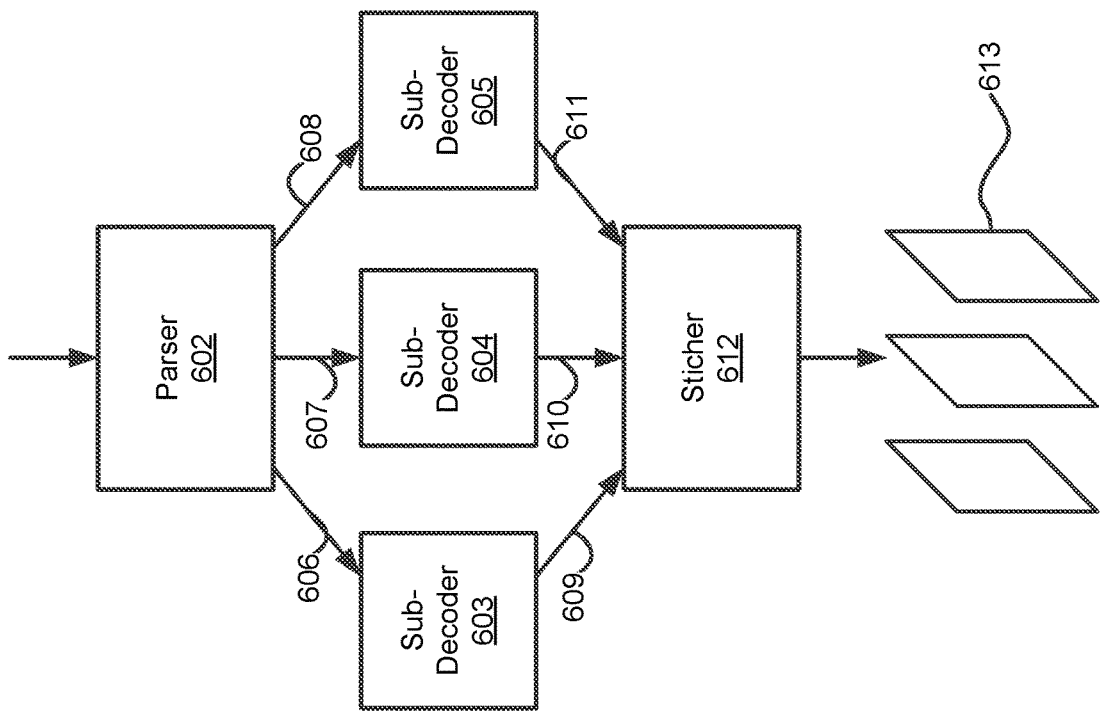
Fig. 6a  System 600a

Fig. 7

7.3.6.1 General slice segment header syntax

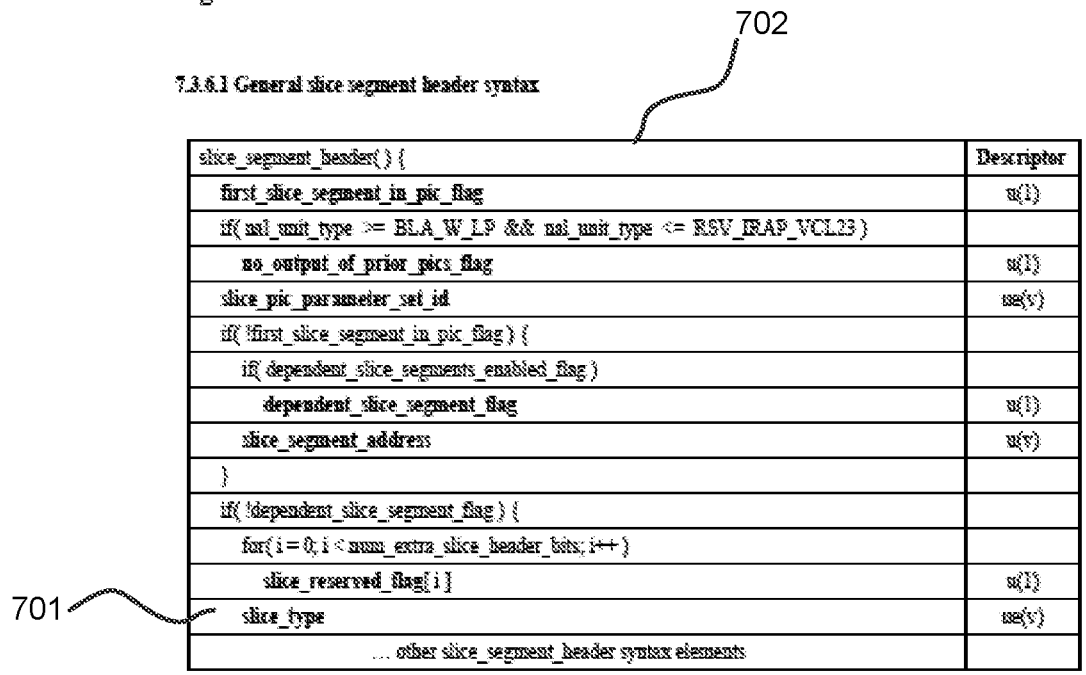

slice_type specifies the coding type of the slice according to Table 7-7.

Table 7-7 – Name association to slice_type

| slice_type | Name of slice_type |
|---|---|
| 0 | B (B slice) |
| 1 | P (P slice) |
| 2 | I (I slice) |
| 3 | IP (IP slice) |

When nal_unit_type has a value in the range of BLA_W_LP to RSV_IRAP_VCL23, inclusive, i.e., the picture is an IRAP picture, and nuh_layer_id is equal to 0, slice_type shall be equal to 2 or 3.

When sps_max_dec_pic_buffering_minus1[ TemporalId ] is equal to 0 and nuh_layer_id is equal to 0, slice_type shall be equal to 2 or 3.

Fig. 8 slice_type specifies the coding type of the slice according to Table 7-7.

Table 7-7 – Name association to slice_type

| slice_type | Name of slice_type |
|---|---|
| 0 | B (B slice) |
| 1 | P (P slice) |
| 2 | I (I slice) |
| 3 | PI (PI slice) |

801 ⟿ (pointing to row 3)

When nal_unit_type has a value in the range of BLA_W_LP to RSV_IRAP_VCL23, inclusive, i.e., the picture is an IRAP picture, and nuh_layer_id is equal to 0, slice_type shall be equal to 2.

When sps_max_dec_pic_buffering_minus1[ TemporalId ] is equal to 0 and nuh_layer_id is equal to 0, slice_type shall be equal to 2.

Fig. 9 slice_type specifies the coding type of the slice according to Table 7-7.

Table 7-7 – Name association to slice_type

| slice_type | Name of slice_type |
|---|---|
| 0 | B (B slice) |
| 1 | P (P slice) |
| 2 | I (I slice) |
| 3 | BI (BI slice) |

901 ⟿ (pointing to row 3)

When nal_unit_type has a value in the range of BLA_W_LP to RSV_IRAP_VCL23, inclusive, i.e., the picture is an IRAP picture, and nuh_layer_id is equal to 0, slice_type shall be equal to 2.

When sps_max_dec_pic_buffering_minus1[ TemporalId ] is equal to 0 and nuh_layer_id is equal to 0, slice_type shall be equal to 2.

Fig. 10 slice_type specifies the coding type of the slice according to Table 7-7.

Table 7-7 – Name association to slice_type

| slice_type | Name of slice_type |
|---|---|
| 0 | B (B slice) |
| 1 | P (P slice) |
| 2 | I (I slice) |
| 3 | BI (BI slice) |
| 4 | PI (PI slice) |
| 5 | IP (IP slice) |

1001

When nal_unit_type has a value in the range of BLA_W_LP to RSV_IRAP_VCL23, inclusive, i.e., the picture is an IRAP picture, and nuh_layer_id is equal to 0, slice_type shall be equal to 2.

When sps_max_dec_pic_buffering_minus1[ TemporalId ] is equal to 0 and nuh_layer_id is equal to 0, slice_type shall be equal to 2.

Fig. 11

7.3.6.1 General slice segment header syntax

| slice_segment_header( ) { | Descriptor |
|---|---|
| first_slice_segment_in_pic_flag | u(1) |
| if( nal_unit_type >= BLA_W_LP && nal_unit_type <= RSV_IRAP_VCL23 ) | |
| no_output_of_prior_pics_flag | u(1) |
| slice_pic_parameter_set_id | ue(v) |
| if( !first_slice_segment_in_pic_flag ) { | |
| if( dependent_slice_segments_enabled_flag ) | |
| dependent_slice_segment_flag | u(1) |
| slice_segment_address | u(v) |
| } | |
| ibc_across_slice_boundaries_allowed_flag | u(1) |
| intra_pred_across_slice_boundaries_allowed_flag | u(1) |
| p-prediction-across-slice-boundaries-allowed-flag | u(1) |
| b-prediction-across-slice-boundaries-allowed-flag | u(1) |
| if( !dependent_slice_segment_flag ) { | |
| for( i = 0; i < num_extra_slice_header_bits; i++ ) | |
| slice_reserved_flag[ i ] | u(1) |
| slice_type | ue(v) |
| ... other slice_segment_header syntax elements | |

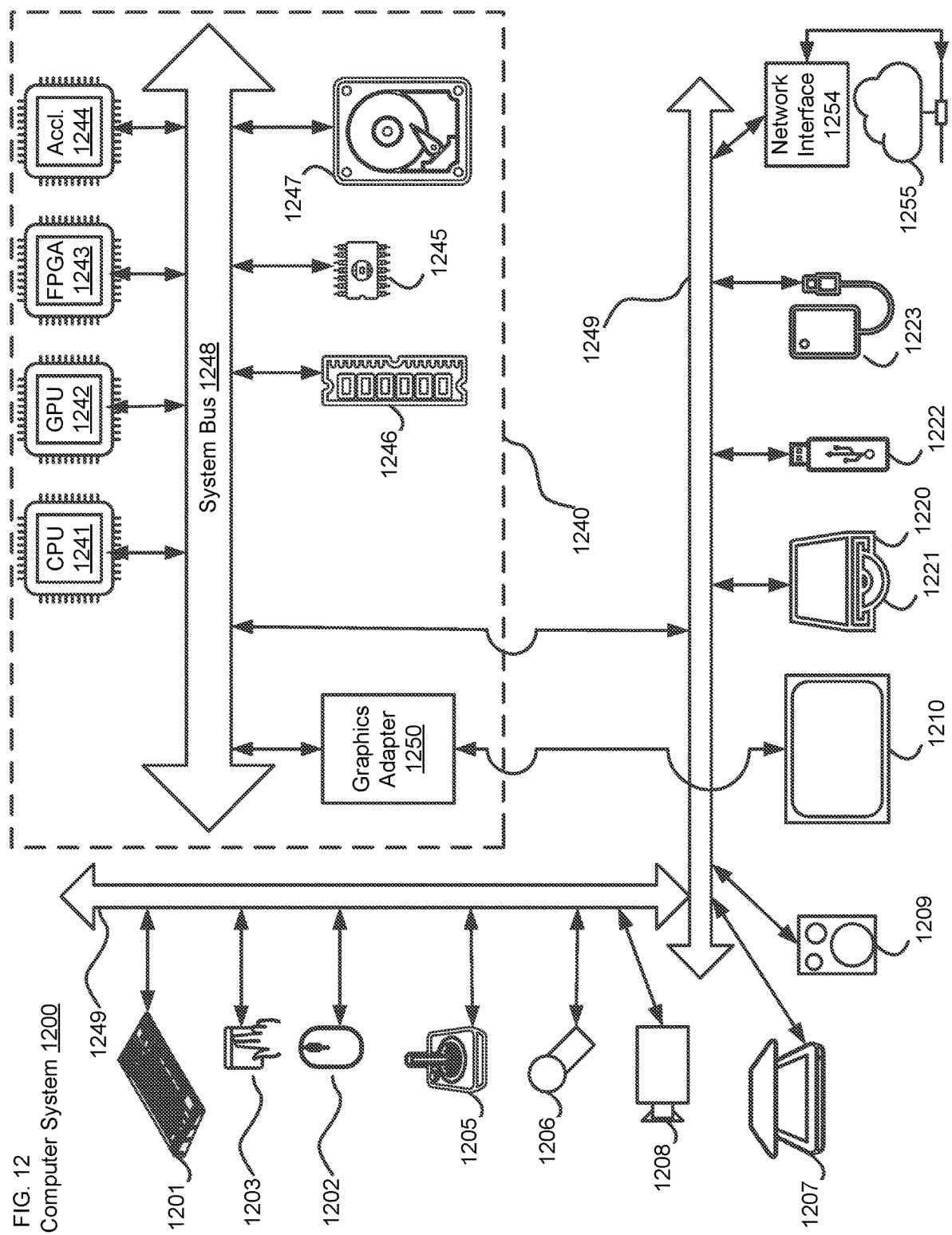

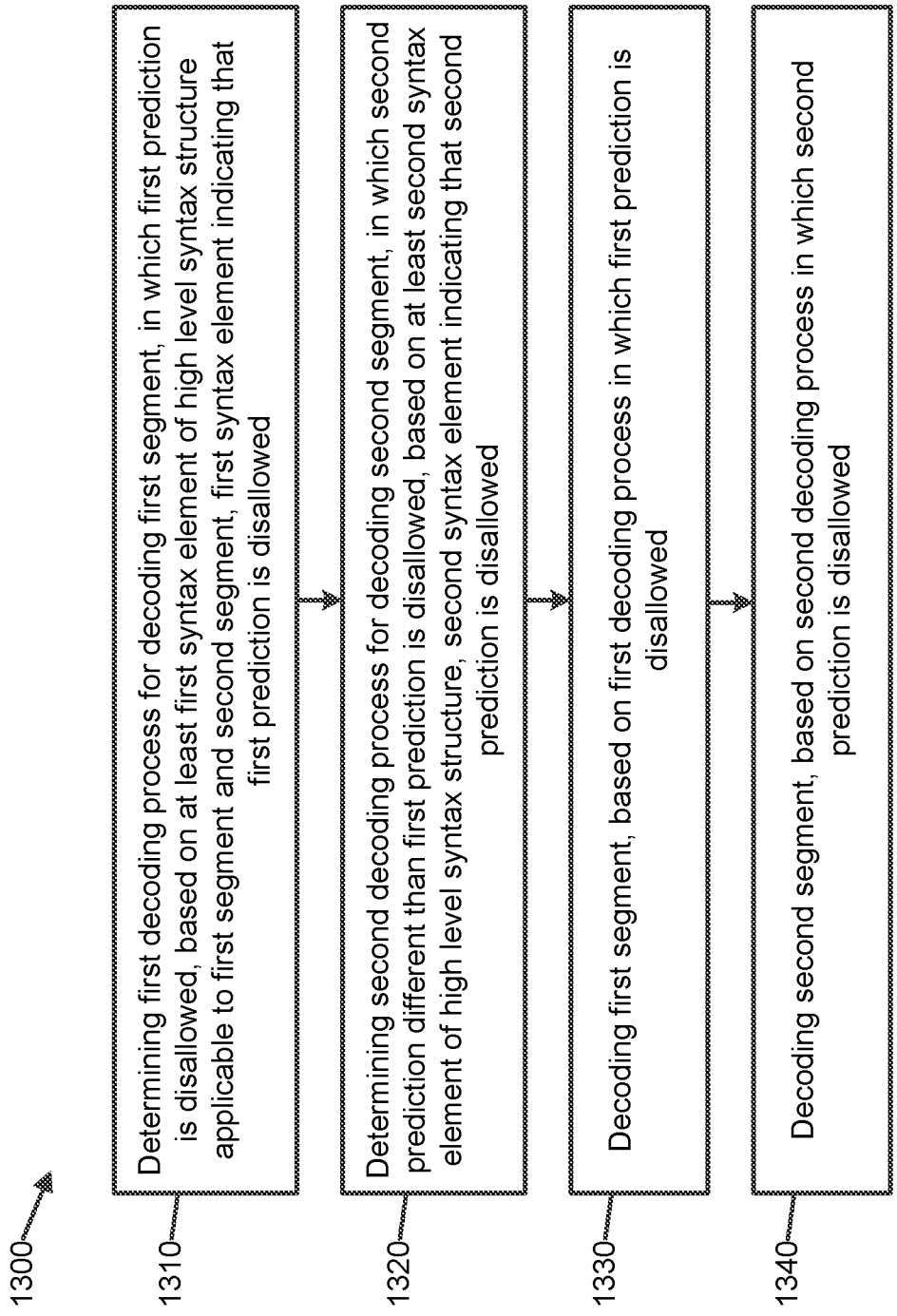

SEGMENT TYPES IN VIDEO CODING

CROSS-REFERENCE TO RELATED APPLICATIONS

This is a continuation application of U.S. patent application Ser. No. 16/202,949 filed on Nov. 28, 2018, in the United States Patent and Trademark Office, which claims priority from U.S. Provisional Patent Application No. 62/727,381, filed on Sep. 5, 2018, in the United States Patent and Trademark Office, which is incorporated herein by reference in its entirety.

BACKGROUND

1. Field

Methods and apparatuses consistent with embodiments relate to video processing, and more particularly, segment types in video coding.

2. Description of Related Art

Video coding and decoding using inter-picture prediction with motion compensation has been known for decades. Uncompressed digital video can consist of a series of pictures, each picture having a spatial dimension of, for example, 1920×1080 luminance samples and associated chrominance samples. The series of pictures can have a fixed or variable picture rate (informally also known as frame rate) of, for example, 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GByte of storage space.

One purpose of video coding and decoding can be the reduction of redundancy in an input video signal, through compression. Compression can help reduce aforementioned bandwidth or storage space requirements, in some cases by two orders of magnitude or more. Both lossless and lossy compression, as well as a combination thereof, can be employed. Lossless compression refers to techniques where an exact copy of an original signal can be reconstructed from a compressed original signal. When using lossy compression, a reconstructed signal may not be identical to an original signal, but the distortion between the original and reconstructed signals is small enough to make the reconstructed signal useful for an intended application. In the case of video, lossy compression is widely employed. The amount of distortion tolerated depends on the application; for example, users of certain consumer streaming applications may tolerate higher distortion than users of television contribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding, some of which will be introduced below.

A coded video bitstream can be a compressed representation of uncompressed source video and can be divided into coded pictures. A coded picture comprises one or more picture segments. A picture segment can be, for example, a slice, a tile, a group of blocks (GOB), and so forth. Picture segments may include a segment header such as a slice header, a tile header, a GOB header, and so forth, that may include information pertaining to one or more coding units (CUs) that can make up a remainder of a segment. In some cases, information in the segment header can pertain to a first CU in the segment but can be overwritten by corresponding update information located in CU headers. In other cases, the information in the segment header can pertain to all CUs in the segment.

Picture segmentation was included in video compression technologies and standards for a number of reasons. One reason for the introduction of slices in MPEG-1 was the desire for Maximum Transfer Unit (MTU) size matching. In a scenario in which a coded picture is larger than the MTU of a packet in a certain packet network, it was deemed desirable to split that picture into somewhat independently decodable units, hence the introduction of slices. Another reason was the desire to simplify the composition, perhaps in the compressed domain, of sub-pictures into a coded picture. H.261's Group of Block (GOB) concept (and especially the GOB numbering used in H.261) is one early example of such a technique, while H.263's rectangular slices are another example. Another reason was to enable encoding and/or decoding, in which multiple encoder/decoder processors or cores simultaneously decode parts of a given picture.

Tiles are one more mechanism of several available in certain video codecs that help to partition a coded video bitstream. A tile can be a rectangular area of a picture. The scan order of CUs, also known as blocks or macroblocks, can be local to a tile, top left-to-right, then top-to-bottom. A picture can be separated into a number of tiles wherein each CU can be part of exactly one tile. Tiles were introduced to enable parallel encoding and decoding, by allowing each processor or core to focus its attention to only a part of the picture to be coded, in that no communication to processors responsible for other tiles is required except for the final bitstream generation process; however, they can also serve as a mechanism for picture composition.

Picture segmentation techniques can have in common that the segment boundaries interrupt certain prediction mechanisms. For example, in some video coding technologies and standards, a segment boundary interrupts in-picture prediction mechanisms, such as motion vector prediction, intra prediction, and so forth. To what extent inter-picture prediction mechanisms, such as motion compensation using samples outside of the segment boundary is allowed, depends on the video coding technology or standard. For example, in H.263+, the independent segment decoding mode offers a setting in which no import of sample values through motion compensation across a segment boundary is allowed. Constrained tile sets in H.265 serve a similar purpose.

Picture segmentation techniques can further have in common that only certain types of coding units are allowed in a segment of a given type. For example, in some video coding technologies and standards, an intra slice can contain only CUs coded in intra mode, an inter slice can contain CUs in intra and inter mode, and a bi-predicted slice can contain CUs coded in intra, inter, and bi-predicted mode. As it can be observed, in at least some video coding technologies or standards, the segment types form a hierarchy, such as intra segments are the most restrictive, followed by inter segments, followed by bi-predicted segments.

Intra segments can be used to reset the decoder state to a known state with respect to certain part of the current decoded picture (covered by the intra segment).

Recent video coding technologies can include techniques that share certain similarities between inter, intra, and (perhaps to a lesser extent) bi-prediction. For example, the screen content coding (SCC) profile of H.265 includes a technology known as intra block copy (IBC), which can be characterized as a motion compensation mechanism in which the reference sample information is part of the same decoded picture as the samples under reconstruction. See, e.g., "HEVC Screen Content Coding Draft Text," ITU-T/ISO/IEC, JCTVC-T1005, 2015. No previously decoded reference picture needs to be accessed, which is a feature that is common for intra coding. However, the reconstruction of a given CU can require sample information from outside the CU, which is a feature that, in older video coding standards such as MPEG-2, is traditionally considered a feature of inter coding.

The interaction between intra segments and certain modern coding tools such as IBC can be complicated. On one hand, IBC has been shown, at least in certain cases, as an effective tool to improve coding efficiency for intra codec areas of a picture under reconstruction. However, IBC in at least some cases works better the more area of the picture under reconstruction is available for IBC's use as reference samples, and that may include samples outside of the current segment under reconstruction. However, using samples outside the current segment for IBC reference can be counterproductive to the goal of intra segments resetting a given area to a known state without referring to any information outside the segment.

The same can be true for arguably less advanced (or, at least, older) tools, such as intra prediction.

Accordingly, video compression technologies or standards tend to forbid any reference to outside sample and meta information by intra slice CUs. This can be implemented, for example, by marking any samples and any CUs outside the segment boundary as unavailable for prediction. This decision, however, in at least some cases in which the goal of intra segments of resetting the decoding process is irrelevant, unnecessarily reduces the coding efficiency.

SUMMARY

According to embodiments, a method of decoding a coded picture of a coded video sequence including a first segment and a second segment, is performed by at least one processor and includes determining a first decoding process for decoding the first segment, in which a first prediction is disallowed, based on at least a first syntax element of a high level syntax structure applicable to the first segment and the second segment, the first syntax element indicating that the first prediction is disallowed. The method further includes determining a second decoding process for decoding the second segment, in which a second prediction different than the first prediction is disallowed, based on at least a second syntax element of the high level syntax structure, the second syntax element indicating that the second prediction is disallowed. The method further includes decoding the first segment, based on the first decoding process in which the first prediction is disallowed, and decoding the second segment, based on the second decoding process in which the second prediction is disallowed.

According to embodiments, an apparatus for decoding a coded picture of a coded video sequence including a first segment and a second segment, includes at least one memory configured to store computer program code, and at least one processor configured to access the at least one memory and operate according to the computer program code. The computer program code includes first determining code configured to cause the at least one processor to determine a first decoding process for decoding the first segment, in which a first prediction is disallowed, based on at least a first syntax element of a high level syntax structure applicable to the first segment and the second segment, the first syntax element indicating that the first prediction is disallowed. The computer program code further includes second determining code configured to cause the at least one processor to determine a second decoding process for decoding the second segment, in which a second prediction different than the first prediction is disallowed, based on at least a second syntax element of the high level syntax structure, the second syntax element indicating that the second prediction is disallowed. The computer program code further includes first decoding code configured to cause the at least one processor to decode the first segment, based on the first decoding process in which the first prediction is disallowed, and second decoding code configured to cause the at least one processor to decode the second segment, based on the second decoding process in which the second prediction is disallowed.

According to embodiments, a non-transitory computer-readable storage medium stores a program for decoding a coded picture of a coded video sequence including a first segment and a second segment. The program includes instructions that cause a processor to determine a first decoding process for decoding the first segment, in which a first prediction is disallowed, based on at least a first syntax element of a high level syntax structure applicable to the first segment and the second segment, the first syntax element indicating that the first prediction is disallowed. The instructions further cause the processor to determine a second decoding process for decoding the second segment, in which a second prediction different than the first prediction is disallowed, based on at least a second syntax element of the high level syntax structure, the second syntax element indicating that the second prediction is disallowed. The instructions further cause the processor to decode the first segment, based on the first decoding process in which the first prediction is disallowed, and decode the second segment, based on the second decoding process in which the second prediction is disallowed.

BRIEF DESCRIPTION OF THE DRAWINGS

FIGS. 6A and 6B are diagrams of parallel decoder systems for segmented pictures, according to an embodiment.

FIG. 7 is a diagram of syntax and semantics of an IP slice syntax element, according to an embodiment.

FIG. 8 is a diagram of syntax and semantics of a PI slice syntax element, according to an embodiment.

FIG. 9 is a diagram of syntax and semantics of a B slice syntax element, according to an embodiment.

FIG. 10 is a diagram of syntax and semantics of a BI, PI, and IP slice syntax element, according to an embodiment.

FIG. 11 is a diagram of syntax and semantics of prediction across boundaries flags, according to an embodiment.

FIG. 12 is a diagram of a computer system suitable for implementing embodiments.

FIG. 13 is a flowchart illustrating a method of decoding a coded picture of a coded video sequence comprising a first segment and a second segment, according to an embodiment.

DETAILED DESCRIPTION

Embodiments relate to video coding and decoding, and more specifically, to a segmentation of a coded video picture into segments such as slices and tiles that may not conform to known types of intra, inter, bi-predicted slices or tiles. For example, a slice or tile containing only intra encoded blocks may still use prediction information from slices or tiles outside the slice or tile under reconstruction, but of the same picture in a decoding order. In such a scenario, the picture, as a whole, may be decodable independently from other pictures, whereas the slice or tile may require other slices or tiles of the same picture for successful decoding.

Figure 1:
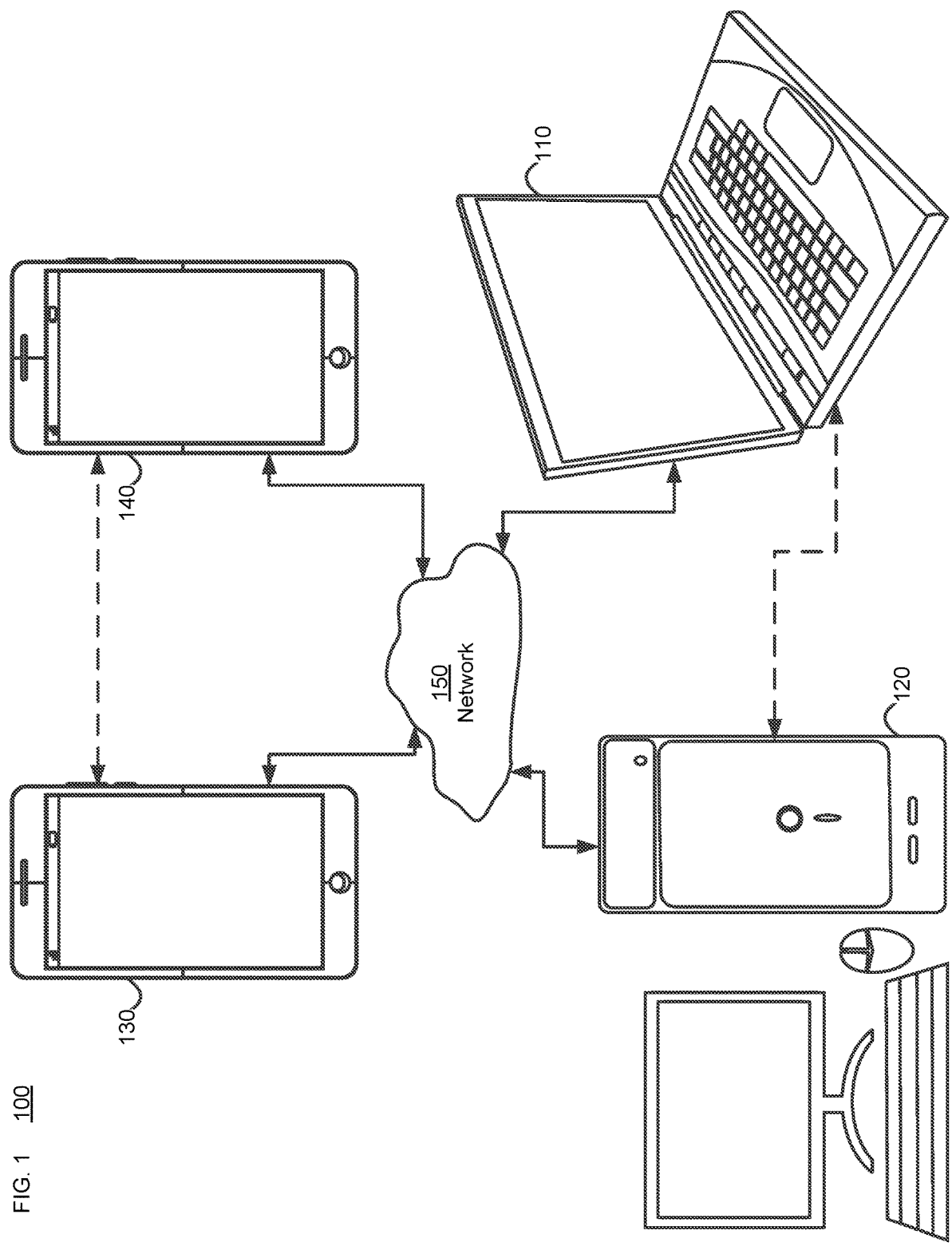
FIG. 1 is a simplified block diagram of a communication system according to an embodiment.

FIG. 1 is a simplified block diagram of a communication system (100) according to an embodiment. The communication system (100) may include at least two terminals (110-120) interconnected via a network (150). For unidirectional transmission of data, a first terminal (110) may code video data at a local location for transmission to the other terminal (120) via the network (150). The second terminal (120) may receive the coded video data of the other terminal from the network (150), decode the coded data and display the recovered video data. Unidirectional data transmission may be common in media serving applications and the like.

FIG. 1 illustrates a second pair of terminals (130, 140) provided to support bidirectional transmission of coded video that may occur, for example, during videoconferencing. For bidirectional transmission of data, each terminal (130, 140) may code video data captured at a local location for transmission to the other terminal via the network (150). Each terminal (130, 140) also may receive the coded video data transmitted by the other terminal, may decode the coded data and may display the recovered video data at a local display device.

In FIG. 1, the terminals (110-140) may be illustrated as servers, personal computers and smart phones but the principles of embodiments are not so limited. Embodiments find application with laptop computers, tablet computers, media players and/or dedicated video conferencing equipment. The network (150) represents any number of networks that convey coded video data among the terminals (110-140), including for example wireline and/or wireless communication networks. The communication network (150) may exchange data in circuit-switched and/or packet-switched channels. Representative networks include telecommunications networks, local area networks, wide area networks and/or the Internet. For the purposes of the present discussion, the architecture and topology of the network (150) may be immaterial to the operation of embodiments unless explained herein below.

Figure 2:
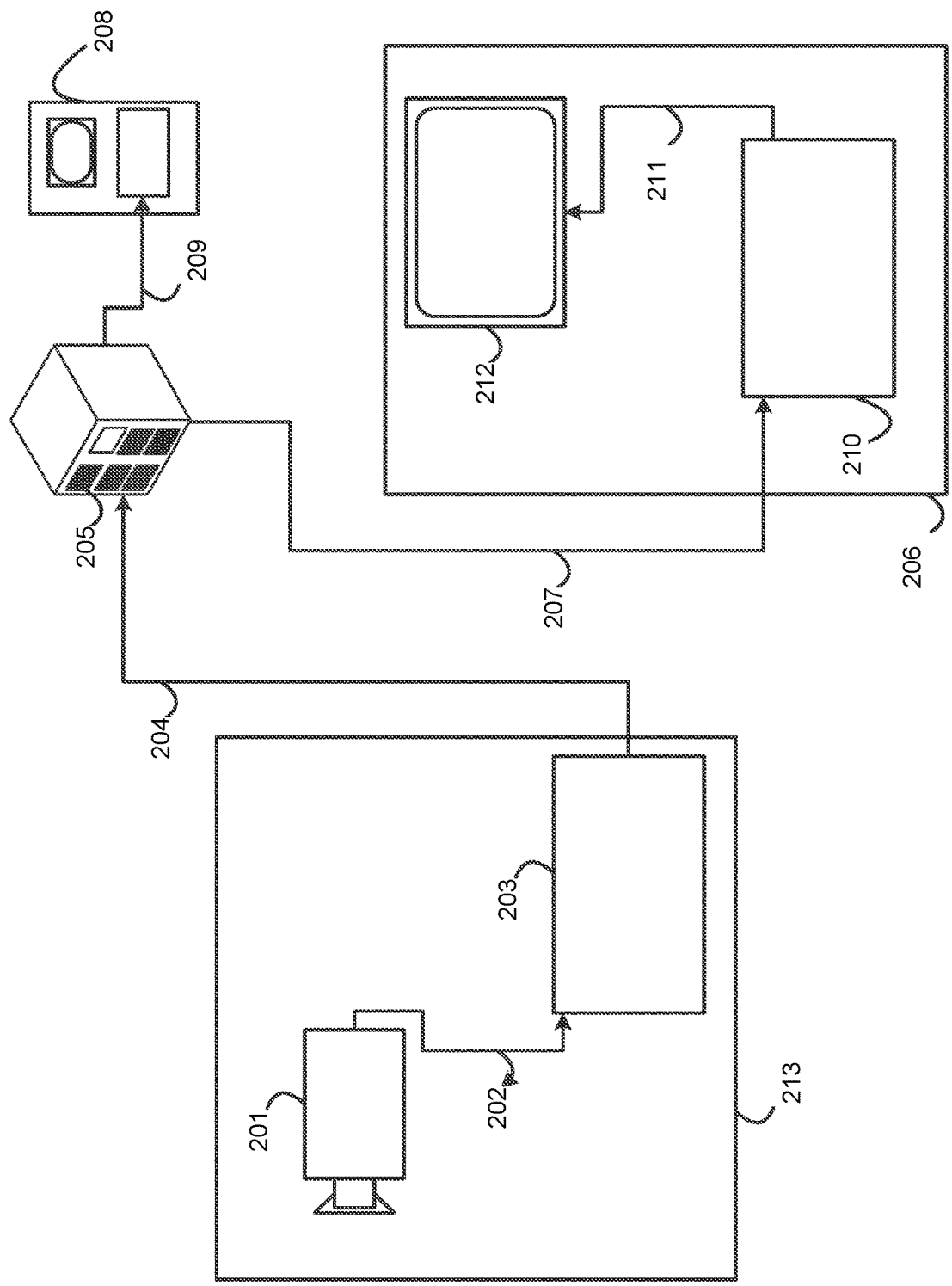
FIG. 2 is a diagram of a placement of a video encoder and a video decoder in a streaming environment, according to an embodiment.

FIG. 2 is a diagram of a placement of a video encoder and a video decoder in a streaming environment, according to an embodiment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (213) that can include a video source (201), for example a digital camera, creating, for example, an uncompressed video sample stream (202). That sample stream (202), depicted as a bold line to emphasize a high data volume when compared to encoded video bitstreams, can be processed by an encoder (203) coupled to the camera (201). The encoder (203) can include hardware, software, or a combination thereof to enable or implement aspects of the disclosed subject matter as described in more detail below. The encoded video bitstream (204), depicted as a thin line to emphasize the lower data volume when compared to the sample stream, can be stored on a streaming server (205) for future use. One or more streaming clients (206, 208) can access the streaming server (205) to retrieve copies (207, 209) of the encoded video bitstream (204). A client (206) can include a video decoder (210) which decodes the incoming copy of the encoded video bitstream (207) and creates an outgoing video sample stream (211) that can be rendered on a display (212) or other rendering device (not depicted). In some streaming systems, the video bitstreams (204, 207, 209) can be encoded according to certain video coding/compression standards. Examples of those standards include ITU-T Recommendation H.265. Under development is a video coding standard informally known as Versatile Video Coding (VVC). The disclosed subject matter may be used in the context of VVC.

Figure 3:
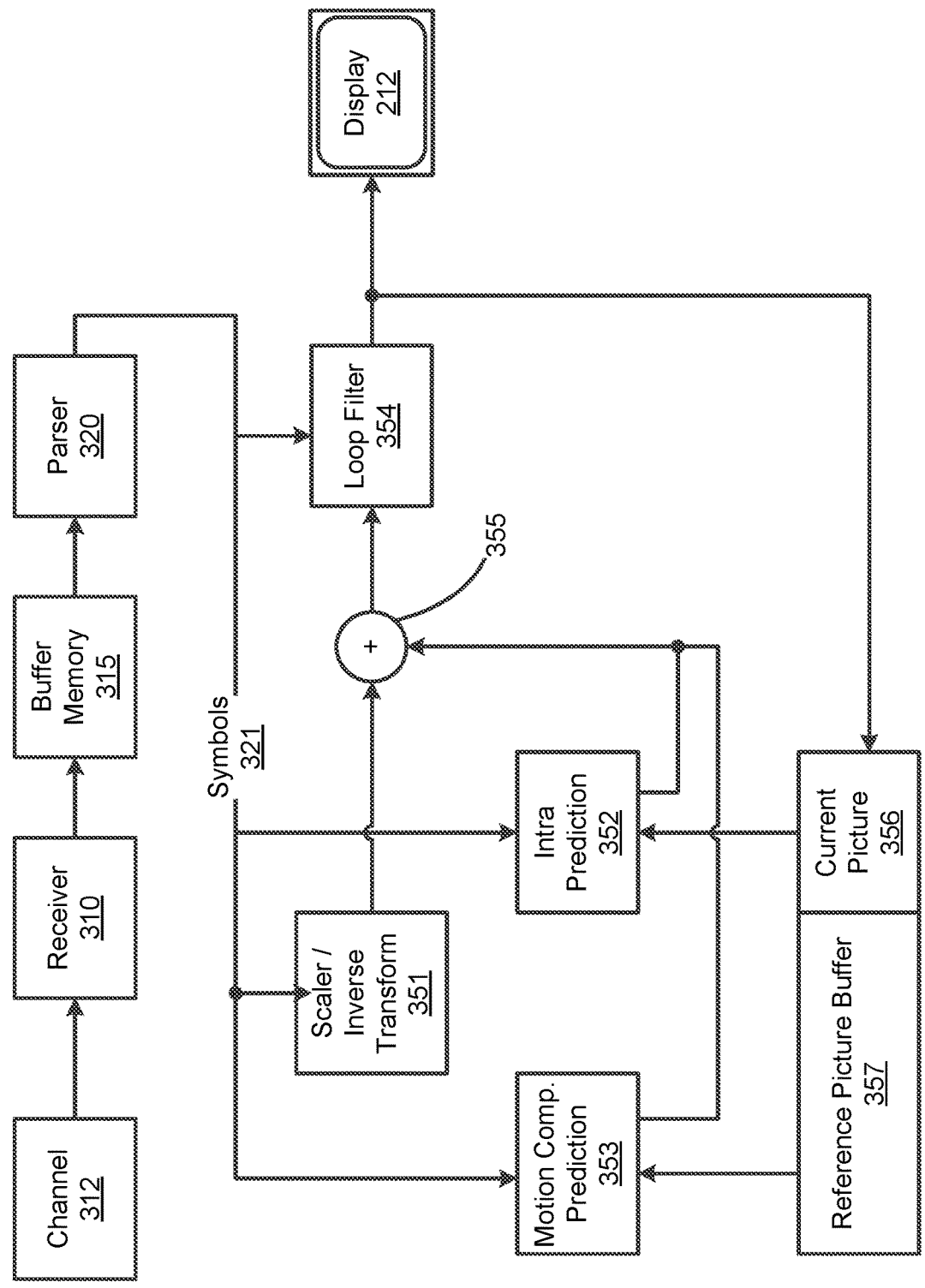
FIG. 3 is a functional block diagram of a video decoder according to an embodiment.

FIG. 3 is a functional block diagram of a video decoder (210) according to an embodiment.

A receiver (310) may receive one or more codec video sequences to be decoded by the decoder (210); in the same or another embodiment, one coded video sequence at a time, where the decoding of each coded video sequence is independent from other coded video sequences. The coded video sequence may be received from a channel (312), which may be a hardware/software link to a storage device which stores the encoded video data. The receiver (310) may receive the encoded video data with other data, for example, coded audio data and/or ancillary data streams, that may be forwarded to their respective using entities (not depicted). The receiver (310) may separate the coded video sequence from the other data. To combat network jitter, a buffer memory (315) may be coupled in between receiver (310) and entropy decoder/parser (320) ("parser" henceforth). When receiver (310) is receiving data from a store/forward device of sufficient bandwidth and controllability, or from an isosychronous network, the buffer (315) may not be needed, or can be small. For use on best effort packet networks such as the Internet, the buffer (315) may be required, can be comparatively large and can advantageously of adaptive size.

The video decoder (210) may include a parser (320) to reconstruct symbols (321) from the entropy coded video sequence. Categories of those symbols include information used to manage operation of the decoder (210), and potentially information to control a rendering device such as a display (212) that is not an integral part of the decoder but can be coupled to it, as was shown in FIG. 3. The control information for the rendering device(s) may be in the form of Supplementary Enhancement Information (SEI messages) or Video Usability Information (VUI) parameter set fragments (not depicted). The parser (320) may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser (320) may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter (QP) values, motion vectors, and so forth.

The parser (320) may perform entropy decoding/parsing operation on the video sequence received from the buffer (315), so to create symbols (321). The parser (320) may receive encoded data, and selectively decode particular symbols (321). Further, the parser (320) may determine whether the particular symbols (321) are to be provided to a Motion Compensation Prediction unit (353), a scaler/inverse transform unit (351), an Intra Prediction unit (352), or a loop filter unit (354).

Reconstruction of the symbols (321) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (320). The flow of such subgroup control information between the parser (320) and the multiple units below is not depicted for clarity.

Beyond the functional blocks already mentioned, decoder (210) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (351). The scaler/inverse transform unit (351) receives quantized transform coefficient as well as control information, including which transform to use, block size, quantization factor, quantization scaling matrices, etc. as symbol(s) (321) from the parser (320). It can output blocks comprising sample values, which can be input into aggregator (355).

In some cases, the output samples of the scaler/inverse transform (351) can pertain to an intra coded block; that is: a block that is not using predictive information from previously reconstructed pictures, but can use predictive information from previously reconstructed parts of the current picture. Such predictive information can be provided by an intra picture prediction unit (352). In some cases, the intra picture prediction unit (352) generates a block of the same size and shape of the block under reconstruction, using surrounding already reconstructed information fetched from the current (partly reconstructed) picture (356). The aggregator (355), in some cases, adds, on a per sample basis, the prediction information the intra prediction unit (352) has generated to the output sample information as provided by the scaler/inverse transform unit (351).

In other cases, the output samples of the scaler/inverse transform unit (351) can pertain to an inter coded, and potentially motion compensated block. In such a case, a Motion Compensation Prediction unit (353) can access reference picture memory (357) to fetch samples used for prediction. After motion compensating the fetched samples in accordance with the symbols (321) pertaining to the block, these samples can be added by the aggregator (355) to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols (321) that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator (355) can be subject to various loop filtering techniques in the loop filter unit (354). Video compression technologies can include in-loop filter technologies that are controlled by parameters included in the coded video bitstream and made available to the loop filter unit (354) as symbols (321) from the parser (320), but can also be responsive to meta-information obtained during the decoding of previous (in decoding order) parts of the coded picture or coded video sequence, as well as responsive to previously reconstructed and loop-filtered sample values.

The output of the loop filter unit (354) can be a sample stream that can be output to the render device (212) as well as stored in the reference picture memory (356) for use in future inter-picture prediction.

Certain coded pictures, once fully reconstructed, can be used as reference pictures for future prediction. Once a coded picture is fully reconstructed and the coded picture has been identified as a reference picture (by, for example, parser (320)), the current reference picture (356) can become part of the reference picture buffer (357), and a fresh current picture memory can be reallocated before commencing the reconstruction of the following coded picture.

The video decoder (210) may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (310) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or signal-to-noise ratio (SNR) enhancement layers, redundant slices, redundant pictures, forward error correction codes, and so on.

Figure 4:
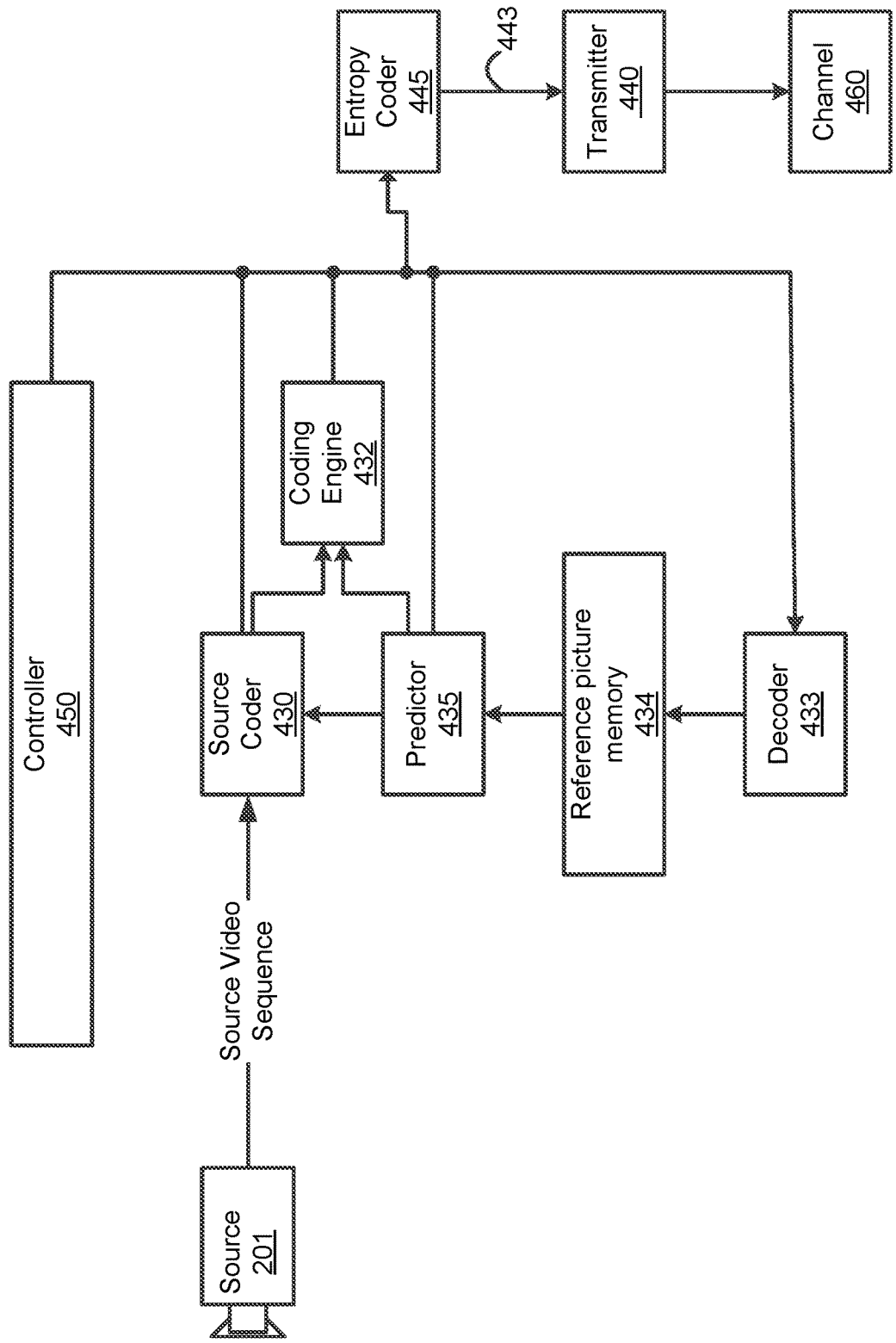
FIG. 4 is a functional block diagram of a video encoder according to an embodiment.

FIG. 4 is a functional block diagram of a video encoder (203) according to an embodiment.

The encoder (203) may receive video samples from a video source (201) (that is not part of the encoder) that may capture video image(s) to be coded by the encoder (203).

The video source (201) may provide the source video sequence to be coded by the encoder (203) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (201) may be a storage device storing previously prepared video. In a videoconferencing system, the video source (201) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the encoder (203) may code and compress the pictures of the source video sequence into a coded video sequence (443) in real time or under any other time constraints as required by the application. Enforcing appropriate coding speed is one function of Controller (450). Controller controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller (450) as they may pertain to video encoder (203) optimized for a certain system design.

Some video encoders operate in what a person skilled in the art readily recognizes as a "coding loop." As an over-simplified description, a coding loop can consist of the encoding part of an encoder (430) ("source coder" henceforth) (responsible for creating symbols based on an input picture to be coded, and a reference picture(s)), and a (local) decoder (433) embedded in the encoder (203) that reconstructs the symbols to create the sample data that a (remote) decoder also would create (as any compression between symbols and coded video bitstream is lossless in the video compression technologies considered in the disclosed subject matter). That reconstructed sample stream is input to the reference picture memory (434). As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder (433) can be the same as of a "remote" decoder (210), which has already been described in detail above in conjunction with FIG. 3. Briefly referring also to FIG. 3, however, as symbols are available and en/decoding of symbols to a coded video sequence by entropy coder (445) and parser (320) can be lossless, the entropy decoding parts of decoder (210), including channel (312), receiver (310), buffer (315), and parser (320) may not be fully implemented in local decoder (433).

An observation that can be made at this point is that any decoder technology except the parsing/entropy decoding that is present in a decoder also necessarily needs to be present, in substantially identical functional form, in a corresponding encoder. The description of encoder technologies can be abbreviated as they are the inverse of the comprehensively described decoder technologies. Only in certain areas a more detail description is required and provided below.

As part of its operation, the source coder (430) may perform motion compensated predictive coding, which codes an input frame predictively with reference to one or more previously-coded frames from the video sequence that were designated as "reference frames." In this manner, the coding engine (432) codes differences between pixel blocks of an input frame and pixel blocks of reference frame(s) that may be selected as prediction reference(s) to the input frame.

The local video decoder (433) may decode coded video data of frames that may be designated as reference frames, based on symbols created by the source coder (430). Operations of the coding engine (432) may advantageously be lossy processes. When the coded video data may be decoded at a video decoder (not shown in FIG. 3), the reconstructed video sequence typically may be a replica of the source video sequence with some errors. The local video decoder (433) replicates decoding processes that may be performed by the video decoder on reference frames and may cause reconstructed reference frames to be stored in the reference picture cache (434). In this manner, the encoder (203) may store copies of reconstructed reference frames locally that have common content as the reconstructed reference frames that will be obtained by a far-end video decoder (absent transmission errors).

The predictor (435) may perform prediction searches for the coding engine (432). That is, for a new frame to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures. The predictor (435) may operate on a sample block-by-pixel block basis to find appropriate prediction references. In some cases, as determined by search results obtained by the predictor (435), an input picture may have prediction references drawn from multiple reference pictures stored in the reference picture memory (434).

The controller (450) may manage coding operations of the video coder (430), including, for example, setting of parameters and subgroup parameters used for encoding the video data.

Output of all aforementioned functional units may be subjected to entropy coding in the entropy coder (445). The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter (440) may buffer the coded video sequence(s) as created by the entropy coder (445) to prepare it for transmission via a communication channel (460), which may be a hardware/software link to a storage device that may store the encoded video data. The transmitter (440)

may merge coded video data from the video coder (430) with other data to be transmitted, for example, coded audio data and/or ancillary data streams (sources not shown).

The controller (450) may manage operation of the encoder (203). During coding, the controller (450) may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder (203) may perform coding operations according to a predetermined video coding technology or standard, such as ITU-T Rec. H.265. In its operation, the video coder (203) may perform various compression operations, including predictive coding operations that exploit temporal and spatial redundancies in the input video sequence. The coded video data, therefore, may conform to a syntax specified by the video coding technology or standard being used.

In an embodiment, the transmitter (440) may transmit additional data with the encoded video. The video coder (430) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

In the following, the embodiments are described using tiles as an example of coded picture segments. The embodiments can, in at least some cases, equally be applied to other segment types such as slices, GOBs and so forth.

Figure 5:
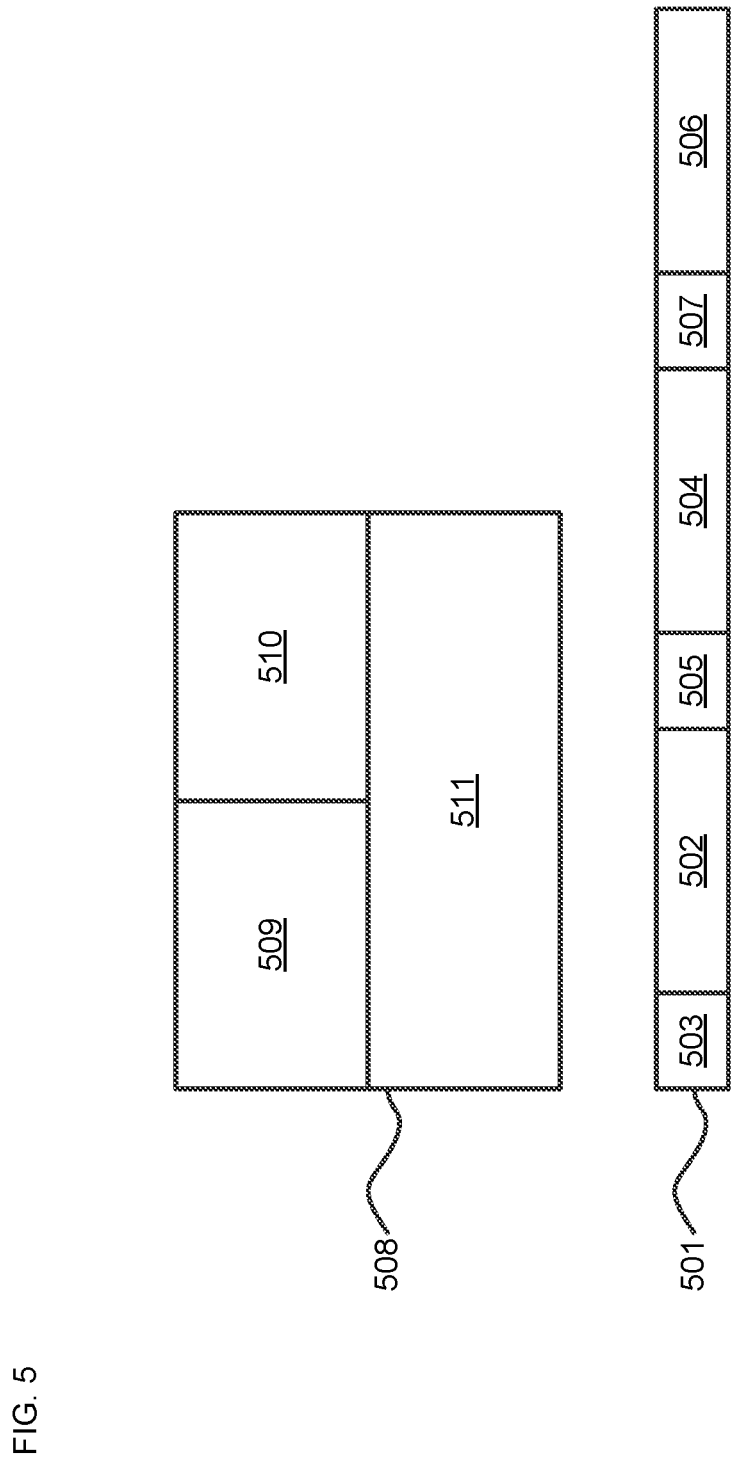
FIG. 5 is a diagram of a tiled picture according to an embodiment.

FIG. 5 is a diagram of a tiled picture according to an embodiment.

Referring to FIG. 5, in an embodiment, a coded picture (501) may be divided into three tile bitstreams (502, 504, 506), which represent in a reconstructed picture (508), three spatial regions (509, 510, 511), respectively. In this example, each tile may use a tile header (503, 505, 507). The example uses three tiles, but a person skilled in the art can readily generalize the example into more or less than three tiles. Each tile can contain, in addition to its header, one or more coding units CUs, that can be arranged in scan order. That is, for coding units in consecutive order in the tile's bitstream (502, 504, or 506), the area covered by the coding unit is arranged such that the following coding unit is to the right and to the bottom of the previous coding units, following in principle the scan order established by cathode ray tube (CRT) rays. A person skilled in the art is readily familiar with scan order of coding units for coding units of both uniform and differing sizes.

According to known video coding technologies or standards, only certain forms of prediction are allowed across tile boundaries as shown in the spatial representation of the reconstructed picture (508). For example, H.265's tiles break all forms of prediction within a coded picture, be it prediction from meta-data (such as intra prediction modes, motion vectors, and so forth), or sample prediction (such as prediction samples used in intra prediction, or sample data for IBC prediction). H.265's motion-constrained tile sets further break the import of sample values through motion compensation from spatial areas in reference pictures outside of the current tile set. In that, motion constrained tile sets are comparable to H.263's rectangular slices with independent segment decoding mode enabled.

These sets of constraints were historically defined after identifying certain (limited) application scenarios, in reaction to these scenarios and in response to certain hardware-implementation related constraints. However, the introduction of new coding tools, the ever growing desire for additional coding efficiency, and the recognition of additional application scenarios make more flexible definitions of the semantics of tile boundaries with respect to interruption of different forms of prediction desirable.

FIGS. 6A and 6B are diagrams of parallel decoder systems for segmented pictures, according to an embodiment.

Referring to FIG. 5 and FIG. 6A, a system (600*a*) is shown, in which the three spatial regions (509, 510, 511) each cover an area too large to be decoded by a single decoder. In such a scenario, the system (600*a*) may be used, the system (600*a*) including multiple sub-decoders that each produce a video sample stream representing the content of a single coded tile. The incoming, tiled coded video bitstream can be decomposed in the compressed domain into coded sub-bistreams representing the three spatial regions (509, 510, 511) by a parser (602). When using a suitable syntax, such as the syntax of, for example, H.265 with motion constrained tile sets enabled, the decomposition can be a relatively lightweight process requiring little (if any) signal processing beyond bitstream parsing. The (comparatively) low bandwidth nature of the compressed coded video bitstream (when compared to reconstructed sample streams) is shown as a thin line. Three sub-decoders (603, 604, 605) may receive, through similarly low bandwidth communication links (606, 607, 608) (also depicted as thin lines), bits of the coded sub bitstreams they are responsible for decoding and decode one region per decoder into a reconstructed tile. The samples of the reconstructed tiles as generated by the three sub-decoders (603, 604, 605), may be delivered by high bandwidth links (609, 610, 611) to a stitcher (612). The stitcher (612) may aggregate the tiles into a single sample stream representing all reconstructed tiles in a single reconstructed picture stream (613). Sub-decoders (603, 604, 605) may, in this scenario, have no communication relationship with each other, may exchange only (minimal) control information, but do not communicate prediction information nor sample information between each other. Therefore, no such communication relationship is depicted.

Based on above observations, a person skilled in the art can readily devise a corresponding encoding system, which is therefore not depicted nor described in more detail.

As in system (600a), by definition, there is no communication of prediction information between the sub-decoders (602, 603, 604) of the decoding system (600a), nor any such communication in a comparable encoder system, such a system is appropriate for independent sub-decoders or sub-encoders. However, it may also be appropriate for application scenarios where the decoder and/or encoder are not distributed into sub-decoders/sub-encoders, but based on application needs. For example, if it is known that the (in this example: three) spatial regions have no semantic relationship with each other, there is little, if any chance that coding efficiency gains can be realized through prediction across region/tile boundaries. Any import (in the form of artifacts) of sample information from a neighboring tile into the tile under reconstruction should be avoided. For example, if a spatial region were containing content from a camera source whereas the other spatial regions contain content from other camera sources, artificial content, other projections in a 360 scenario, and so on, the correlation between the content of the various reasons may be small or non-existence. Accordingly, there may be little or no advantage of using prediction between those regions, even if using prediction may be technically feasible by the system design. This scenario was one of the reasons for the inclusion of motion constrained tile sets into H.265.

FIG. 6B depicts a somewhat different system design (600b). Once more, the system comprises a parser (602) that decomposes an incoming tiled coded video bitstream into three sub-bitstreams (606, 607, 608) that feed into three sub-decoders (603, 604, 605). The sub-decoders each create reconstructed tiles that are conveyed (609, 610, 611) to a stitcher (612), which in turn creates the output reconstructed picture stream (613). However, in this design, a limited amount of information can be passed between the sub-decoders (603, 604, 605) over a suitable communication link (614) of medium bandwidth—perhaps not enough for conveying large amounts of sample information, but more than for minimal control information (to be described in more detail below). The nature of the communication link can be a full mesh, a bus, shared memory, or any other appropriate communication technique. Depicted as a medium bandwidth communication link (614) here is a bus that connects the sub-decoders (603, 604, 605).

A person skilled in the art can readily devise a corresponding encoding system.

The decoding system (600b) may allow the use of certain types of prediction across tile boundaries. Which type of prediction can be used relies largely on the available bandwidth of the medium bandwidth communication link (614).

In a first example, the link (614) may have sufficient bandwidth for small amounts of meta data, and very limited sample data (such as, for example, a few sample values per coding unit (CU) to be decoded). In such a scenario, certain intra prediction mechanisms may be supportable, but intra block copy and motion compensation may not be supportable. This scenario was contemplated with H.265's motion constrained tile sets.

In a second example, the link (614) may have sufficient bandwidth for meta data and sample data associated with motion compensation from a single reference picture in previous decoding order, but insufficient bandwidth or insufficient coordination ability to use intra block copy. This is the scenario that was envisioned with H.265's non motion-constraint (regular) tile sets. Intra block copy may be more burdensome in some implementations compared to (past picture) motion compensation because it can require quasi-concurrent access of, in many implementations, closely neighboring sample data in the current picture memory, which can lead to cache inefficiencies (especially if the cache design is not optimized for IBC). The coordination ability can pose a conceptual problem. If the reconstruction of a tile can require the access of other tiles in the same reconstructed picture, the decoding pipeline for a given tile may need to stall until the IBC-referenced samples in the other tile become available. While the discussion herein, so far, has focused on tiles, with respect to this scenario it should be noted that if the segments were not tiles but slices that are decoded linearly and in scan order, the above coordination problem does not exist, though the memory access problem may still be an issue in some implementations.

In a third example, the link (614) may have sufficient bandwidth and coordination ability for both P-picture style motion compensation and IBC. Such a scenario is currently not contemplated in the context of H.265, but is the basis of the "IP Slice" concept, described below.

Finally, in a fourth example, the medium bitrate link (614) may have sufficient bitrate (and coordination ability) to support all forms of prediction contemplated in the video technology or standard, including, for example, intra prediction, IBC, P-style and B-style inter prediction. Some shared memory and multi-processor architectures allow for such a fourth scenario. Here, no limitations of use prediction tools across tile (or, indeed, segment) boundaries may be required.

It must be noted that, while the above description may read as if there were a hierarchy of prediction technologies that may or may not be feasible based on link (614) bandwidth and/or coordination ability, that is not necessarily the case. As one trivial example, the memory bandwidth requirements for IBC are in a similar magnitude compared to P prediction, whereas B prediction can require twice that bandwidth (and multi-hypothesis prediction even more). However, the coordination aspect of IBC may prevent its use across tile boundaries even if the memory bandwidth of the system design may allow for bi-prediction or multi-hypothesis prediction. Other architectural constraints may also be present.

It can be noted that the above example hard ware architectures may be used in combination. For example, it is well possible that a hard tiling according to system (600a) may be required to split a very large picture (8 k and above) into units of manageable size (for example, at the time of writing, 4 k resolution is implementable under commercially reasonable constraints in both software and hardware encoders and decoders). Within those hard tiles (of, in this example 4 k resolution), further tiling can be advantageous, and can be achieved through one or more of the scenarios related to system (600b).

Once more, attention must be drawn that the selection of used prediction mechanisms across tile boundaries (or, more general, segment boundaries) can be driven not only by hardware implementation constraints such as the ones mentioned above, but also by application needs. In some cases, it can be advantageous to prevent one or more forms of prediction across tile and segment boundaries from an application and coding efficiency viewpoint.

In the current video coding technologies and standards, the forms of prediction that are being interrupted are inflexible, and, in most cases, tied to concepts and syntax elements that serve different purposes. Using H.265 as an example (the list below is non-exhaustive):

IBC is allowed only when certain profiles are enabled, and no prediction of IBC is allowed across slice/tile boundaries, regardless of profile;

motion compensation is allowed only for P slices and B slices (and independent of tiles) and across tile/slice boundaries unless a motion-constrained tile set syntax element is set; and intra prediction is not allowed to cross slice boundaries but can cross tile boundaries.

Some of these constraints can be explained with the gradual involvement of H.265. For example, H.265 was added after the first version of H.265 was published, and therefore needed to be placed (and its use signaled) through a profile. However, regardless of the history that made certain design choices necessary, the H.265 design does not allow certain combinations of prediction mechanisms across certain segment boundaries. This shortcoming of H.265 and other current video coding technologies and standards is addressed now.

Changing the support of certain prediction mechanisms across a segment boundary in a video compression technology or standard can have two implications, which both may need to be considered.

The first implication can be the need for specifying the operation of a decoder when a certain prediction mechanism is in use, or when it is disallowed and therefore not in use. In many video coding technologies and standards, this can be done by appropriately defining the "availability" of reference samples or reference meta data, and an inferring mechanism that becomes used when an unallowed prediction across a segment boundary were implied in the bitstream. Those mechanisms are well known to a person skilled in the art and not further elaborated on herein.

The second implication can be that the allowed prediction tools across segment boundaries need to be specified in the bitstream. Options for this signaling mechanism are described below, in an order from a minimal change compared to the signaling mechanisms available in H.265 to more universal mechanisms.

Of the four examples of architectural constraints described above in conjunction with system (600*b*), the third example (allowing both IBC and P-prediction) can be allowed by the introduction of one or more additional slice types.

FIG. 7 is a diagram of syntax and semantics of an IP slice syntax element, according to an embodiment.

In the same or another embodiment, a new slice type referred to herein as IP slice is introduced. An IP slice can be signaled using an appropriate value for the slice_type syntax element (701) in the slice_segment_header( ) syntax structure (702), as shown in FIG. 7, with the modified (relative to H.265) semantics (703) of slice_type. Modifications are shown using underscored text to indicate additions. The IP slice type can share all its properties with an I slice, except that it allows IBC across its slice boundaries. In the same or another embodiment, an Independent Decoder Refresh picture (IDR picture) can be composed of I and IP slices (704).

FIG. 8 is a diagram of syntax and semantics of a PI slice syntax element, according to an embodiment.

In the same or another embodiment, a new slice type referred to herein as PI slice is introduced. A PI slice can be can be signaled using an appropriate value for the slice_type syntax element (701) in the slice_segment_header( ) syntax structure (702), as shown in FIG. 7 with the modified semantics (801) of slice_type as shown in FIG. 8. The PI slice type shares all its properties with a P slice, except that it allows IBC across its slice boundaries.

FIG. 9 is a diagram of syntax and semantics of a B slice syntax element, according to an embodiment.

In the same or another embodiment, a new slice type referred to herein as BI slice is introduced. A BI slice can be can be signaled using an appropriate value for the slice_type syntax element (701) in the slice_segment_header( ) syntax structure (702), as shown in FIG. 7, with the modified semantics (901) of slice_type as shown in FIG. 9. The BI slice type shares all its properties with a B slice, except that it allows IBC across its slice boundaries.

FIG. 10 is a diagram of syntax and semantics of a BI, PI, and IP slice syntax element, according to an embodiment.

In the same or another embodiment, two or more of the aforementioned novel slice types can be specified in combination. As an example, FIG. 10 shows the semantics (1001) of the slice_type syntax element with all three aforementioned novel slice types included.

In the same or another embodiment, the use of traditional I, B, and P slices can imply that no IBC prediction is allowed across slice boundaries, regardless of the profile in use.

FIG. 11 is a diagram of syntax and semantics of prediction across boundaries flags, according to an embodiment.

Referring to FIG. 11, in the same or another embodiment, a new syntax element ibc_accross_slice_boundaries_allowed_flag (1101) and/or ibc_across_tile_boundaries_allowed_flag, can be introduced to a high level syntax structure such as, for example, slice segment header (1102), tile header, picture parameter set, sequence parameter set, picture header, GOP header, sequence header, or any other appropriate high level syntax structure. The semantics of such a flag can be as shown in FIG. 11, with ibc_accross_slice_boundaries_allowed_flag as an example.

In the same or another embodiment, similar flags can be introduced for certain other prediction tools, including but not limited to intra prediction (intra_pred_accross_slice_boundaries_allowed_flag, 1104), P-style motion compensation (p-prediction-across-slice-boundaries-allowed-flag, 1105), bi-predicted motion compensation (b-prediction-across-slice-boundaries-allowed-flag, 1106), and so forth. A person skilled in the art can readily device similar syntax elements pertaining to the segment types such as tiles, GOBs, and so forth.

Many optimizations of the coding of aforementioned flag or flags can be possible. For example, since bi-prediction, by definition, is allowed only for B-slices, the presence of b-prediction-across-slice-boundaries-allowed-flag could be gated upon the slice type being a B-slice. Whether or not such parsing dependencies are worth the coding efficiency is topic has that been addressed in video coding technologies and standards in different, and sometimes inconsistent ways. Either form is meant to be included.

The techniques for prediction across segment boundaries, described above, can be implemented as computer software using computer-readable instructions and physically stored in one or more computer-readable media.

FIG. 12 is a diagram of a computer system (1200) suitable for implementing embodiments.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 12 for computer system (1200) are examples in nature and are not intended to suggest any limitation as to the scope of use or functionality of the computer software implementing embodiments. Neither should the configuration of components be interpreted as having any dependency or requirement relating to any one or combination of components illustrated in the embodiment of a computer system (1200).

Computer system (1200) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1201), mouse (1202), trackpad (1203), touch screen (1210), data-glove (1204), joystick (1205), microphone (1206), scanner (1207), camera (1208).

Computer system (1200) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1210), data-glove (1204), or joystick (1205), but there can also be tactile feedback devices that do not serve as input devices), audio output devices (such as: speakers (1209), headphones (not depicted)), visual output devices (such as screens (1210) to include cathode ray tube (CRT) screens, liquid-crystal display (LCD) screens, plasma screens, organic light-emitting diode (OLED) screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1200) can also include human accessible storage devices and their associated media such as optical media including CD/DVD ROM/RW (1220) with CD/DVD or the like media (1221), thumb-drive (1222), removable hard drive or solid state drive (1223), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1200) can also include interface(s) to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include global systems for mobile communications (GSM), third generation (3G), fourth generation (4G), fifth generation (5G), Long-Term Evolution (LTE), and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses ((1249)) (such as, for example universal serial bus (USB) ports of the computer system (1200); others are commonly integrated into the core of the computer system (1200) by attachment to a system bus as described below (for example Ethernet interface into a PC computer system or cellular network interface into a smartphone computer system). Using any of these networks, computer system (1200) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1240) of the computer system (1200).

The core (1240) can include one or more Central Processing Units (CPU) (1241), Graphics Processing Units (GPU) (1242), specialized programmable processing units in the form of Field Programmable Gate Areas (FPGA) (1243), hardware accelerators (1244) for certain tasks, and so forth. These devices, along with Read-only memory (ROM) (1245), Random-access memory (RAM) (1246), internal mass storage such as internal non-user accessible hard drives, solid-state drives (SSDs), and the like (1247), may be connected through a system bus (1248). In some computer systems, the system bus (1248) can be accessible in the form of one or more physical plugs to enable extensions by additional CPUs, GPU, and the like. The peripheral devices can be attached either directly to the core's system bus (1248), or through a peripheral bus (1249). Architectures for a peripheral bus include peripheral component interconnect (PCI), USB, and the like.

CPUs (1241), GPUs (1242), FPGAs (1243), and accelerators (1244) can execute certain instructions that, in combination, can make up the aforementioned computer code. That computer code can be stored in ROM (1245) or RAM (1246). Transitional data can also be stored in RAM (1246), whereas permanent data can be stored for example, in the internal mass storage (1247). Fast storage and retrieve to any of the memory devices can be enabled through the use of cache memory, that can be closely associated with one or more CPU (1241), GPU (1242), mass storage (1247), ROM (1245), RAM (1246), and the like.

The computer readable media can have computer code thereon for performing various computer-implemented operations. The media and computer code can be those specially designed and constructed for the purposes of embodiments, or they can be of the kind well known and available to those having skill in the computer software arts.

As an example and not by way of limitation, the computer system having architecture (1200), and specifically the core (1240) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1240) that are of non-transitory nature, such as core-internal mass storage (1247) or ROM (1245). The software implementing various embodiments can be stored in such devices and executed by core (1240). A computer-readable medium can include one or more memory devices or chips, according to particular needs. The software can cause the core (1240) and specifically the processors therein (including CPU, GPU, FPGA, and the like) to execute particular processes or particular parts of particular processes described herein, including defining data structures stored in RAM (1246) and modifying such data structures according to the processes defined by the software. In addition or as an alternative, the computer system can provide functionality as a result of logic hardwired or otherwise embodied in a circuit (for example: accelerator (1244)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. Embodiments encompass any suitable combination of hardware and software.

FIG. 13 is a flowchart illustrating a method (1300) of decoding a coded picture of a coded video sequence comprising a first segment and a second segment, according to an embodiment. In some implementations, one or more process blocks of FIG. 13 may be performed by the decoder (310). In some implementations, one or more process blocks of FIG. 13 may be performed by another device or a group of devices separate from or including the decoder (310), such as the encoder (303).

Referring to FIG. 13, in a first block (1310), the method (1300) includes determining a first decoding process for decoding the first segment, in which a first prediction is disallowed, based on at least a first syntax element of a high level syntax structure applicable to the first segment and the second segment, the first syntax element indicating that the first prediction is disallowed.

In a second block (1320), the method (1300) includes determining a second decoding process for decoding the second segment, in which a second prediction different than the first prediction is disallowed, based on at least a second syntax element of the high level syntax structure, the second syntax element indicating that the second prediction is disallowed.

In a third block (1330), the method (1300) includes decoding the first segment, based on the first decoding process in which the first prediction is disallowed.

In a fourth block (1340), the method (1300) includes decoding the second segment, based on the second decoding process in which the second prediction is disallowed.

At least one of the first segment and the second segment may include a slice.

At least one of the first segment and the second segment may include a tile.

At least one of the first segment and the second segment may include a group of blocks.

The first prediction may include one of an intra block copy across segment boundaries, an intra prediction across segment boundaries, a predictive picture prediction across segment boundaries and a bi-predictive picture prediction across segment boundaries, and the second prediction may include a different one of the intra block copy across segment boundaries, the intra prediction across segment boundaries, the predictive picture prediction across segment boundaries and the bi-predictive picture prediction across segment boundaries.

Each of the first syntax element and the second syntax element may be a flag of the high level syntax structure.

The high level syntax structure may be a segment header for each of the first segment and the second segment.

The high level syntax structure may be one of a picture parameter set and a sequence parameter set.

The high level syntax structure may be one of a picture header, a group of blocks header and a sequence header.

Although FIG. 13 shows example blocks of the method (1300), in some implementations, the method (1300) may include additional blocks, fewer blocks, different blocks, or differently arranged blocks than those depicted in FIG. 13. Additionally, or alternatively, two or more of the blocks of the method (1300) may be performed in parallel.

Further, the proposed methods may be implemented by processing circuitry (e.g., one or more processors or one or more integrated circuits). In an example, the one or more processors execute a program that is stored in a non-transitory computer-readable medium to perform one or more of the proposed methods.

Figure 14:
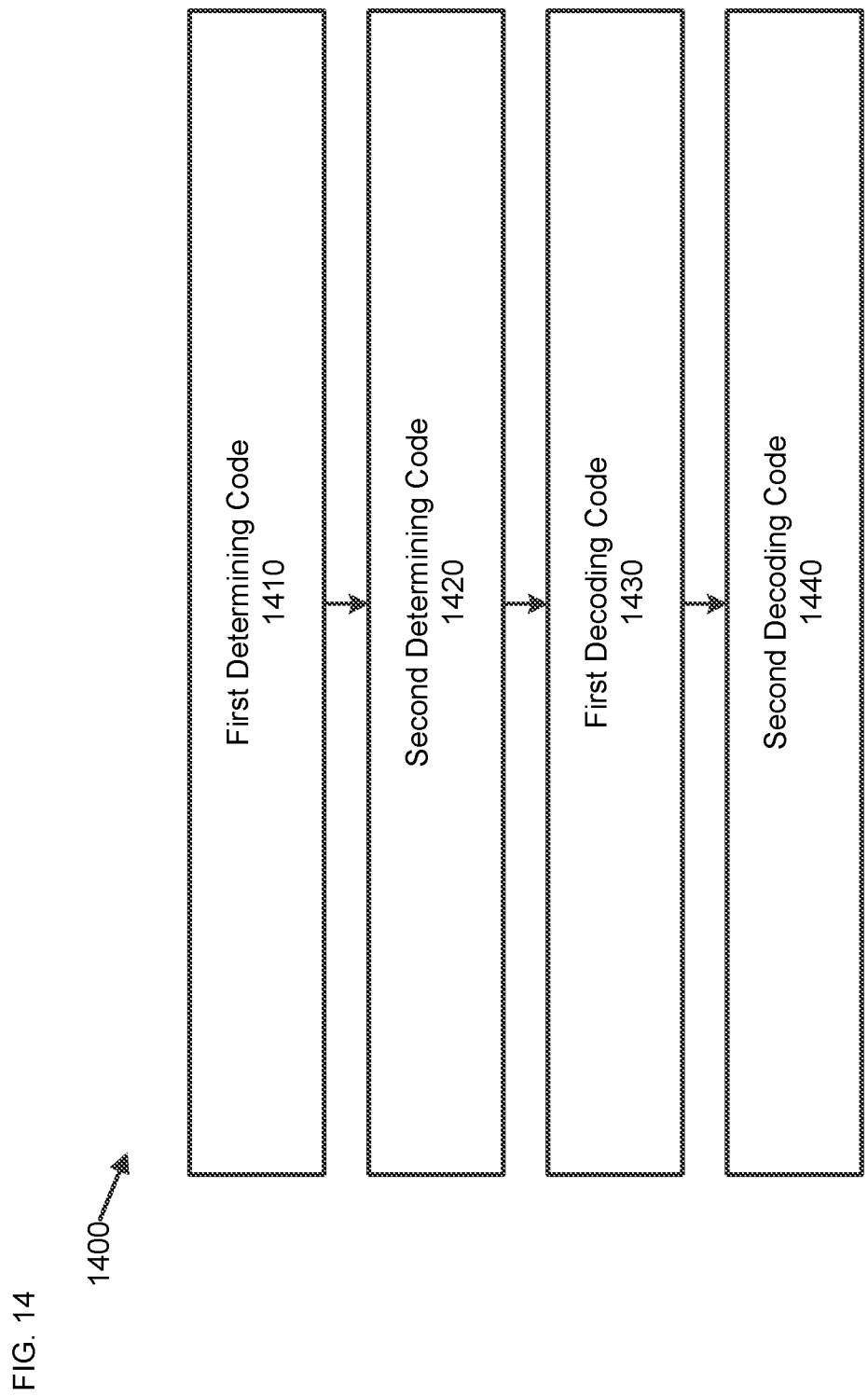
FIG. 14 is a simplified block diagram of an apparatus for decoding a coded picture of a coded video sequence comprising a first segment and a second segment, according to an embodiment.

FIG. 14 is a simplified block diagram of an apparatus (1400) for decoding a coded picture of a coded video sequence comprising a first segment and a second segment, according to an embodiment.

Referring to FIG. 14, the apparatus (1400) includes first determining code (1410), second determining code (1420), first decoding code (1430) and second decoding code (1440).

Referring to FIG. 14, the first determining code (1410) is configured to determine a first decoding process for decoding the first segment, in which a first prediction is disallowed, based on at least a first syntax element of a high level syntax structure applicable to the first segment and the second segment, the first syntax element indicating that the first prediction is disallowed.

The second determining code (1420) is configured to determine a second decoding process for decoding the second segment, in which a second prediction different than the first prediction is disallowed, based on at least a second syntax element of the high level syntax structure, the second syntax element indicating that the second prediction is disallowed.

The first decoding code (1430) is configured to decode the first segment, based on the first decoding process in which the first prediction is disallowed.

The second decoding code (1440) is configured to decode the second segment, based on the second decoding process in which the second prediction is disallowed.

At least one of the first segment and the second segment may include a slice.

At least one of the first segment and the second segment may include a tile.

At least one of the first segment and the second segment may include a group of blocks.

The first prediction may include one of an intra block copy across segment boundaries, an intra prediction across segment boundaries, a predictive picture prediction across segment boundaries and a bi-predictive picture prediction across segment boundaries, and the second prediction may include a different one of the intra block copy across segment boundaries, the intra prediction across segment boundaries, the predictive picture prediction across segment boundaries and the bi-predictive picture prediction across segment boundaries.

Each of the first syntax element and the second syntax element may be a flag of the high level syntax structure.

The high level syntax structure may be a segment header for each of the first segment and the second segment.

The high level syntax structure may be one of a picture parameter set and a sequence parameter set.

The high level syntax structure may be one of a picture header, a group of blocks header and a sequence header.

The techniques described above, can be implemented as computer software using computer-readable instructions and physically stored in one or more computer-readable media.

While this disclosure has described several embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

The invention claimed is:

1. A method of decoding a coded picture of a coded video sequence comprising a first segment and a second segment, the method being performed by at least one processor and the method comprising:
    determining a first decoding process for decoding the first segment, in which a first prediction is disallowed, based on at least a first syntax element indicating that the first prediction is disallowed;
    determining a second decoding process for decoding the second segment, in which a second prediction different than the first prediction is disallowed, based on at least a second syntax element indicating that the second prediction is disallowed;
    decoding the first segment, based on the first decoding process in which the first prediction is disallowed; and
    decoding the second segment, based on the second decoding process in which the second prediction is disallowed.

2. The method of claim 1, wherein at least one of the first segment and the second segment comprises a slice.

3. The method of claim 1, wherein at least one of the first segment and the second segment comprises a tile.

4. The method of claim 1, wherein at least one of the first segment and the second segment comprises a group of blocks.

5. The method of claim 1, wherein the first prediction comprises one of an intra block copy across segment boundaries, an intra prediction across segment boundaries, a predictive picture prediction across segment boundaries and a bi-predictive picture prediction across segment boundaries, and
    the second prediction comprises a different one of the intra block copy across segment boundaries, the intra prediction across segment boundaries, the predictive picture prediction across segment boundaries and the bi-predictive picture prediction across segment boundaries.

6. The method of claim 1, wherein each of the first syntax element and the second syntax element is a flag.

7. The method of claim 1, wherein the first syntax element and the second syntax element are of a segment header for each of the first segment and the second segment.

8. The method of claim 1, wherein the first syntax element and the second syntax element are of one of a picture parameter set and a sequence parameter set.

9. The method of claim 1, wherein the first syntax element and the second syntax element are of one of a picture header, a group of blocks header and a sequence header.

10. An apparatus for decoding a coded picture of a coded video sequence comprising a first segment and a second segment, the apparatus comprising:
    at least one memory configured to store computer program code; and
    at least one processor configured to access the at least one memory and operate according to the computer program code, the computer program code comprising:
        first determining code configured to cause the at least one processor to determine a first decoding process for decoding the first segment, in which a first prediction is disallowed, based on at least a first syntax element indicating that the first prediction is disallowed;
        second determining code configured to cause the at least one processor to determine a second decoding process for decoding the second segment, in which a second prediction different than the first prediction is disallowed, based on at least a second syntax element indicating that the second prediction is disallowed;
        first decoding code configured to cause the at least one processor to decode the first segment, based on the first decoding process in which the first prediction is disallowed; and
        second decoding code configured to cause the at least one processor to decode the second segment, based on the second decoding process in which the second prediction is disallowed.

11. The apparatus of claim 10, wherein at least one of the first segment and the second segment comprises a slice.

12. The apparatus of claim 10, wherein at least one of the first segment and the second segment comprises a tile.

13. The apparatus of claim 10, wherein at least one of the first segment and the second segment comprises a group of blocks.

14. The apparatus of claim 10, wherein the first prediction comprises one of an intra block copy across segment boundaries, an intra prediction across segment boundaries, a predictive picture prediction across segment boundaries and a bi-predictive picture prediction across segment boundaries, and
    the second prediction comprises a different one of the intra block copy across segment boundaries, the intra prediction across segment boundaries, the predictive picture prediction across segment boundaries and the bi-predictive picture prediction across segment boundaries.

15. The apparatus of claim 10, wherein each of the first syntax element and the second syntax element is a flag.

16. The apparatus of claim 10, wherein the first syntax element and the second syntax element are of a segment header for each of the first segment and the second segment.

17. The apparatus of claim 10, wherein the first syntax element and the second syntax element are of one of a picture parameter set and a sequence parameter set.

18. The apparatus of claim 10, wherein the first syntax element and the second syntax element are of one of a picture header, a group of blocks header and a sequence header.

19. A non-transitory computer-readable storage medium storing a program for decoding a coded picture of a coded video sequence comprising a first segment and a second segment, the program comprising instructions that cause a processor to:
- determine a first decoding process for decoding the first segment, in which a first prediction is disallowed, based on at least a first syntax element indicating that the first prediction is disallowed;
- determine a second decoding process for decoding the second segment, in which a second prediction different than the first prediction is disallowed, based on at least a second syntax element indicating that the second prediction is disallowed;
- decode the first segment, based on the first decoding process in which the first prediction is disallowed; and
- decode the second segment, based on the second decoding process in which the second prediction is disallowed.

20. The non-transitory computer-readable storage medium of claim 19, wherein each of the first syntax element and the second syntax element is a flag.

* * * * *